US012417734B2

(12) United States Patent
Chen et al.

(10) Patent No.: US 12,417,734 B2
(45) Date of Patent: Sep. 16, 2025

(54) DISPLAY PANEL AND PIXEL CIRCUIT THEREOF

(71) Applicant: AUO Corporation, Hsinchu (TW)

(72) Inventors: Ying-Chieh Chen, Hsinchu (TW); Yung-Hsiang Lan, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/745,904

(22) Filed: Jun. 17, 2024

(65) Prior Publication Data

US 2025/0014508 A1 Jan. 9, 2025

(30) Foreign Application Priority Data

Jul. 3, 2023 (TW) ................................ 112124784

(51) Int. Cl.
*G09G 3/3233* (2016.01)
*G09G 3/32* (2016.01)

(52) U.S. Cl.
CPC ....... *G09G 3/32* (2013.01); *G09G 2320/0233* (2013.01); *G09G 2320/0247* (2013.01)

(58) Field of Classification Search
CPC ............. G09G 3/32; G09G 2320/0233; G09G 2320/0247; G09G 3/3233
See application file for complete search history.

(56) References Cited

U.S. PATENT DOCUMENTS

| | | | | |
|---|---|---|---|---|
| 10,262,589 | B2 | 4/2019 | Cheng | |
| 11,430,532 | B2 | 8/2022 | Chen et al. | |
| 2018/0108296 | A1 * | 4/2018 | Cheng | G09G 3/3233 |

FOREIGN PATENT DOCUMENTS

| | | |
|---|---|---|
| CN | 112086053 | 12/2020 |
| CN | 114582283 | 6/2022 |
| TW | I596592 | 8/2017 |

* cited by examiner

*Primary Examiner* — Abdul-Samad A Adediran
(74) *Attorney, Agent, or Firm* — JCIPRNET

(57) ABSTRACT

Disclosed are a display panel and a pixel circuit thereof. The pixel circuit includes a driving transistor, a data write-in circuit, a compensation circuit, a voltage control circuit, a light-emitting switch, and a light-emitting element. The driving transistor receives a power supply voltage. The data write-in circuit receives a first scanning signal, an emission signal, and a write-in data signal, stores the write-in data signal, and provides the write-in data signal to a control end of the driving transistor. The compensation circuit has a first switch and a second switch coupled to a relay end and controlled by a second scanning signal. The voltage control circuit adjusts a voltage difference between the control end of the driving transistor and the relay end. The light-emitting switch is coupled between a second end of the driving transistor and the light-emitting element, and is controlled by the emission signal.

10 Claims, 7 Drawing Sheets

DISPLAY PANEL AND PIXEL CIRCUIT THEREOF

CROSS-REFERENCE TO RELATED APPLICATION

This application claims the priority benefit of Taiwan application serial no. 112124784, filed on Jul. 3, 2023. The entirety of the above-mentioned patent application is hereby incorporated by reference herein and made a part of this specification.

BACKGROUND

Technical Field

The disclosure relates to a display panel and a pixel circuit thereof, and in particular to a display panel and a pixel circuit thereof which may stabilize brightness stability.

Description of Related Art

A pixel circuit is a common circuit configured to drive a light-emitting element on a display panel. In order to design a mobile terminal product that is lighter, thinner, and more power-saving, a display panel is required to operate at a lower operating frequency. However, reducing the operating frequency might increase the chance of causing the light-emitting element on the display panel to flicker. The reason for occurrence of flicker is that a leakage current in the pixel circuit is unstable, so that the voltage inside the circuit is unstable, which in turn leads to uneven brightness of the light-emitting element. How to stabilize the leakage current and thereby enable brightness homogeneity of the light-emitting element is an important issue to be solved by personnel in the field.

SUMMARY

The disclosure provides a display panel and a pixel circuit thereof, which may improve brightness stability of a light-emitting element.

The pixel circuit of the disclosure includes a driving transistor, a data write-in circuit, a compensation circuit, a voltage control circuit, a light-emitting switch, and a light-emitting element. The driving transistor has a first end to receive a power supply voltage. The data write-in circuit receives a first scanning signal, an emission signal, and a write-in data signal, stores the write-in data signal based on the first scanning signal, and provides the write-in data signal to a control end of the driving transistor. The compensation circuit has a first switch and a second switch connected in series between the control end of the driving transistor and a second end of the driving transistor, and the first switch and the second switch are coupled to a relay end. The first switch and the second switch are both controlled by a second scanning signal. The voltage control circuit is coupled to the control end of the driving transistor and the relay end to adjust a voltage difference between the control end of the driving transistor and the relay end. The light-emitting switch is coupled between the second end of the driving transistor and the light-emitting element, and is controlled by the emission signal.

The display panel of the disclosure includes multiple pixel circuits. The pixel circuits are arranged in an array on the display panel.

Based on the above, the pixel circuit of the disclosure uses the voltage control circuit and the compensation circuit to adjust the voltage difference between the control end of the driving transistor and the relay end to stabilize a leakage current flowing into the control end of the driving transistor, thereby achieving an effect of stabilizing a driving current.

DETAILED DESCRIPTION OF DISCLOSED EMBODIMENTS

Figure 1:
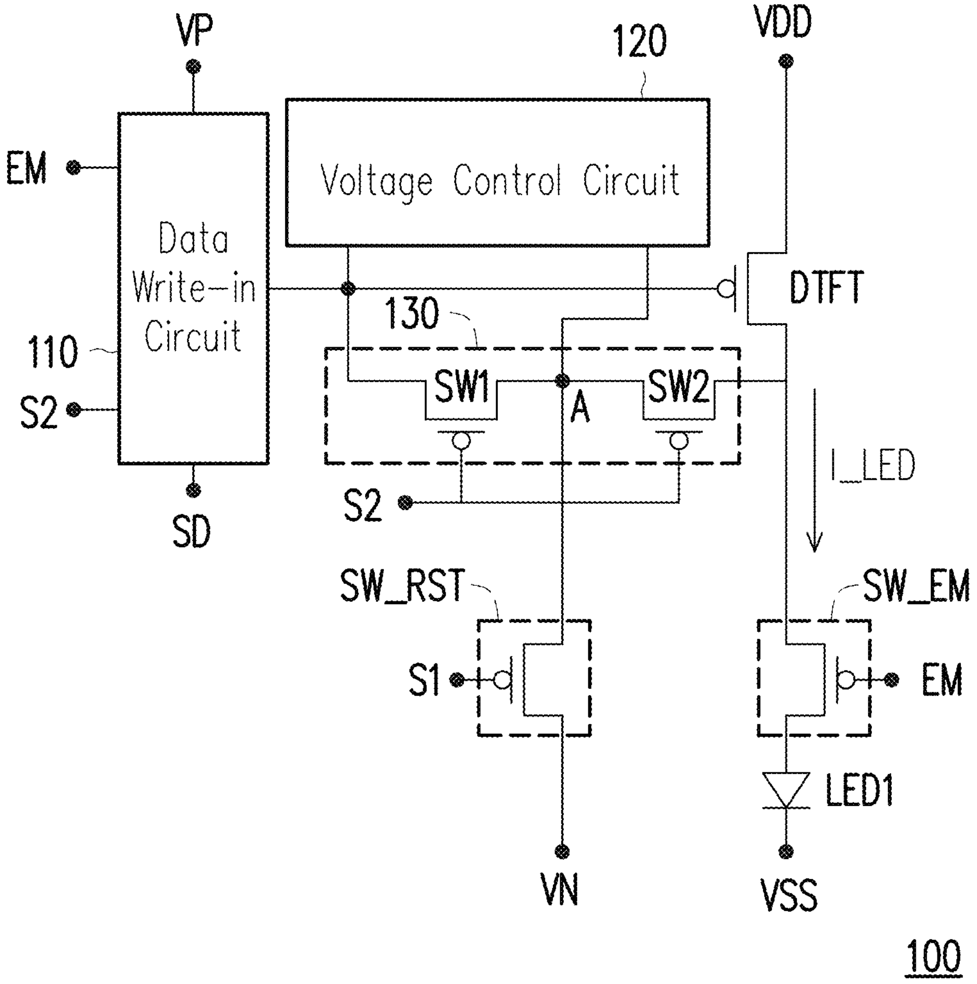
FIG. 1 shows a schematic circuit diagram of a pixel circuit according to an embodiment of the disclosure.

Please refer to FIG. 1. FIG. 1 shows a schematic circuit diagram of a pixel circuit 100 of an embodiment of the disclosure. The pixel circuit 100 includes a data write-in circuit 110, a voltage control circuit 120, a compensation circuit 130, a reset switch SW_RST, a driving transistor DTFT, a light-emitting switch SW_EM, and a light-emitting element LED1.

In the embodiment, the data write-in circuit 110 receives a scanning signal S2, an emission signal EM, and a write-in data signal SD. The compensation circuit 130 is coupled between the data write-in circuit 110 and a control end of the driving transistor DTFT. The compensation circuit 130 has a switch SW1 and a switch SW2, wherein the switch SW1 is disposed between an output end of the data write-in circuit 110 and a relay end A, and a first end of the switch SW1 is coupled to the control end of the driving transistor DTFT, and the switch SW2 is disposed between the relay end A and a second end of the driving transistor DTFT. In addition, a control end of the switch SW1 and a control end of the switch SW2 both receive the scanning signal S2. The voltage control circuit 120 is coupled to the control end of the driving transistor DTFT and the relay end A.

In addition, a first end of the reset switch SW_RST is coupled between the relay end A and a reference voltage end VN, and a control end of the reset switch SW_RST receives a scanning signal S1. A first end of the driving transistor DTFT is configured to receive a power supply voltage VDD. The second end of the driving transistor DTFT is coupled to a second end of the second switch SW2 and a first end of the light-emitting switch SW_EM. A second end of the light-emitting switch SW_EM is coupled between the light-emitting element LED1 and a reference ground end VSS. A control end of the light-emitting switch SW_EM receives the emission signal EM. The light-emitting element LED1 is disposed between the second end of the light-emitting switch SW_EM and the reference ground end VSS. The switch SW1, the switch SW2, the reset switch SW_RST, and the light-emitting switch SW_EM may all be a transistor switch. In the embodiment, the switch SW1, the switch SW2, the reset switch SW_RST, and the light-emitting switch SW_EM are transistor switches composed of a P-type transistor.

In terms of operation details, the data write-in circuit 110 may be turned on based on the scanning signal S2, and enable the write-in data signal SD to be written into the data write-in circuit 110. On the other hand, the write-in data signal SD may be provided to the control end of the driving transistor DTFT through the data write-in circuit 110. At the same time, the reset switch SW_RST may be turned on based on the scanning signal S1, so that a voltage of the relay end A is equal to a voltage of the reference voltage end VN, and the voltage on the relay end A is reset.

On the other hand, the switch SW1 and the switch SW2 may be turned on or cut off at the same time based on the scanning signal S2. When the switch SW1 and the switch SW2 are turned on, relevant information about a critical voltage of the driving transistor DTFT may be transmitted to the data write-in circuit 110 through the switch SW1 and the switch SW2. In this way, the data write-in circuit 110 may compensate a voltage on the control end of the driving transistor DTFT based on the received information about the critical voltage.

In addition, the data write-in circuit 110 may decide whether to receive an operating voltage VP based on the emission signal EM. The light-emitting switch SW_EM may be turned on or cut off based on the emission signal EM to control whether a driving current I_LED may flow to the light-emitting element LED1. In the embodiment, the voltage control circuit 120 is configured to adjust a voltage difference between the control end of the driving transistor DTFT and the relay end A, and to stabilize a leakage current between the control end of the transistor DTFT and the relay end A, thereby stabilizing the voltage on the control end of the driving transistor DTFT to achieve a stabilization of the driving current I_LED.

Please note that when the switch SW1 and the switch SW2 are cut off, there is a leakage current between the switch SW1 and the switch SW2, and the control end of the driving transistor DTFT. The leakage current flows from the relay end A to the control end of the driving transistor DTFT through the switch SW1. In the embodiment, the voltage control circuit 120 provides a path on the control end of the driving transistor DTFT, and performs leakage current extraction through the path. In this way, the degree of influence of the leakage current on the voltage on the control end of the driving transistor DTFT may be effectively reduced, further stabilizing a current of the driving current I_LED.

It is worth mentioning that in the embodiment, the operating voltage VP may be less than the maximum voltage of the write-in data signal SD, and the potential of the reference voltage end VN may be equal to the potential of the reference ground end VSS.

Figure 2:
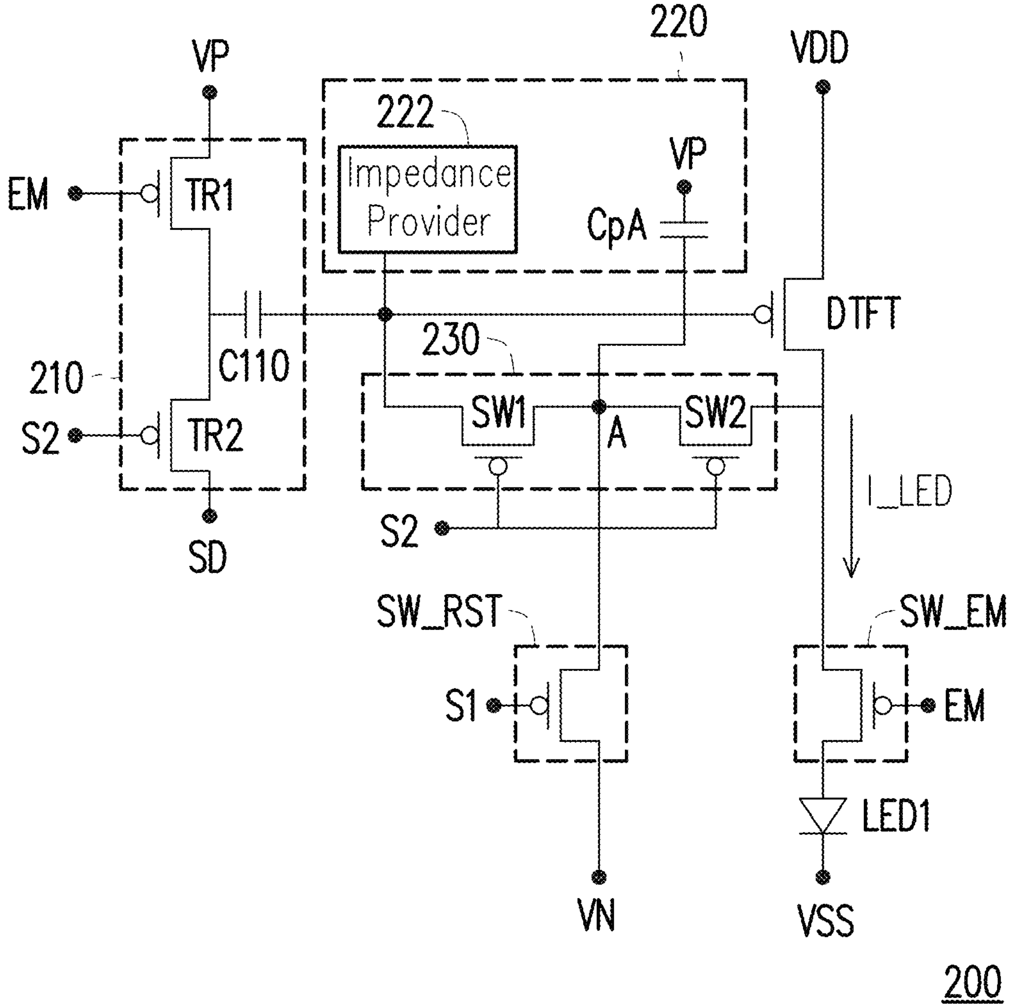
FIG. 2 shows a schematic circuit diagram of a pixel circuit according to another embodiment of the disclosure.

Please refer to FIG. 2. FIG. 2 shows a schematic circuit diagram of a pixel circuit 200 of another embodiment of the disclosure. The pixel circuit 200 includes a data write-in circuit 210, a voltage control circuit 220, a compensation circuit 230, the driving transistor DTFT, the light-emitting switch SW_EM, and the reset switch SW_RST.

In FIG. 2, the data write-in circuit 210 includes a capacitor C110, a transistor TR1, and a transistor TR2. A first end of the transistor TR1 receives the operating voltage VP, and a control end of the transistor TR1 receives the emission signal EM, and a second end of the transistor TR1 is configured to couple to a first end of the capacitor C110. A first end of the transistor TR2 is also coupled to the first end of capacitor C110. A control end of the transistor TR2 receives the scanning signal S2, and a second end of the transistor TR2 receives the write-in data signal SD. A second end of the capacitor C110 is coupled to the control end of the driving transistor DTFT. The voltage control circuit 220 includes an impedance provider 222 and a capacitor CpA. The impedance provider 222 is coupled to the second end of the capacitor C110. A first end of the capacitor CpA receives the operating voltage VP, and a second end of the capacitor CpA is coupled to the relay end A. The second end of the capacitor C110 is coupled to the control end of the driving transistor DTFT.

In terms of operation details, when the transistor TR2 is turned on based on the scanning signal S2, the write-in data signal SD may be transmitted and stored in the capacitor C110, and the write-in data signal SD may be transmitted to the control end of the driving transistor DTFT through the capacitor C110. When the transistor TR1 is turned on based on the emission signal EM, the first end of the capacitor C110 may receive the operating voltage VP, and the second end of the capacitor C110 (coupled to the control end of the driving transistor DTFT) may generate a voltage pumping action based on the operating voltage VP. It is worth noting that the transistor TR1 and the transistor TR2 are turned on at different times.

In the voltage control circuit 220, the impedance provider 222 may be configured to extract a leakage current between the control end of the stable driving transistor DTFT and the relay end A, and further stabilize a voltage on the control end of the driving transistor DTFT. The leakage current flowing from the relay end A to the control end of the driving transistor DTFT may be vented through the impedance provider 222, so that the leakage current flowing from the relay end A to the control end of the driving transistor DTFT remains stable.

The capacitor CpA may be configured as a voltage stabilizing capacitor on the relay end A, and is configured to stabilize a voltage on the relay end A.

Figure 3A:
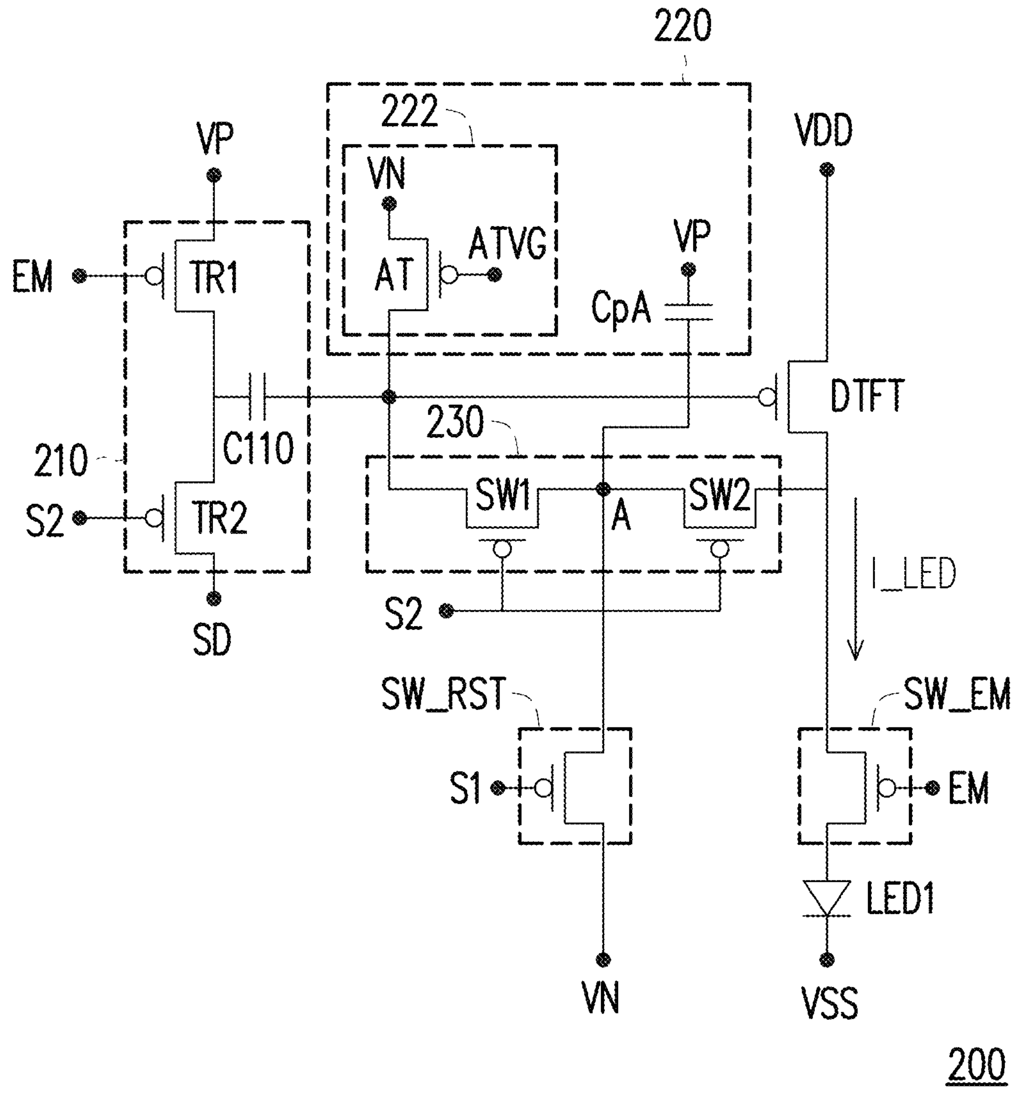
FIG. 3A shows a circuit diagram of an embodiment of the pixel circuit of FIG. 2.
Figure 3B:
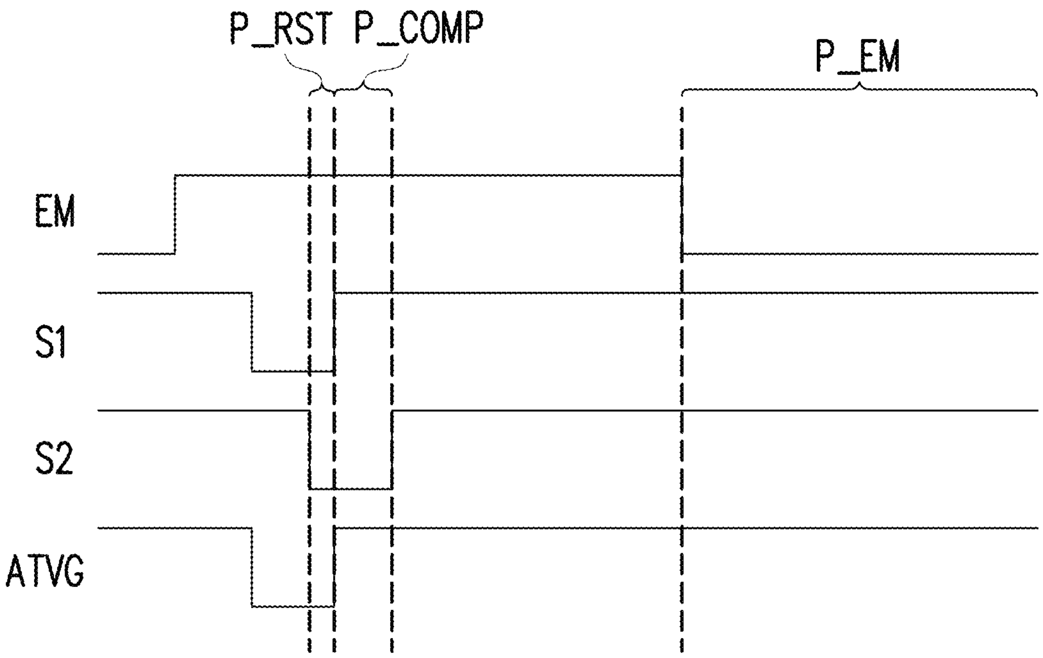
FIG. 3B shows an operation time sequence diagram of an embodiment of the pixel circuit of FIG. 3A.

Please refer to FIG. 3A and FIG. 3B. FIG. 3A shows a circuit diagram of an embodiment of the pixel circuit of FIG. 2, and FIG. 3B shows a waveform diagram of the pixel circuit of FIG. 3A.

In FIG. 3A, the impedance provider 222 may be a transistor AT. A first end of the transistor AT is coupled to the reference voltage end VN, a second end of the transistor AT is coupled to the control end of the driving transistor DTFT, and a control voltage ATVG at a control end of the transistor AT may be a bias voltage or the scanning signal S1.

In terms of operation details, when the control end of the transistor AT chooses to receive a bias voltage VGH, the transistor AT may be enabled to have high impedance. When the control end of the transistor AT chooses to receive the scanning signal S1 and the light-emitting element LED1 emits light, the transistor AT is in an off-state and provides a leakage current path on the control end of the driving transistor DTFT. It is worth mentioning that the transistor AT may be any form of transistor. The P-type transistor AT shown in FIG. 3A is only an example for illustration and does not limit the scope of the disclosure. In the embodiment, the transistor AT is, for example, a thin film transistor.

Incidentally, the control voltage ATVG of the transistor AT may be the same as the scanning signal S1, or may be a fixed bias voltage.

In FIG. 3B, the control voltage ATVG of the transistor AT is the same as the scanning signal S1. In a reset time interval P_RST, the control voltage ATVG, the scanning signal S1, and the scanning signal S2 are all a first voltage (a low logic voltage), and the emission signal EM is a second voltage (a high logic voltage), wherein the first voltage is lower than the second voltage. At this time, the reset switch SW_RST and the transistor TR2 are turned on based on the scanning signal S1 and the scanning signal S2 respectively; the transistor AT is turned on based on the control voltage ATVG; the switch SW1 and the switch SW2 in the compensation circuit 230 are turned on based on the scanning signal S2; the transistor TR1 and the light-emitting switch SW_EM are cut off based on the emission signal EM. The reset switch SW_RST being turned on may enable the voltage of the relay end A to be the same as the voltage of the reference voltage end VN (equivalent to a reference ground voltage). In addition, since the switch SW1 and the switch SW2 are turned on, the control end of the driving transistor DTFT and the second end of the driving transistor DTFT may be reset to the reference ground voltage. At the same time, the write-in data signal SD may be transmitted through the transistor TR2 that is turned on and may be stored in the capacitor C110.

Moreover, in a compensation time interval P_COMP (between the reset time interval P_RST and an emission time interval P_EM), the control voltage ATVG and the scanning signal S1 rise to the second voltage, and the emission signal EM is also the second voltage. Only the scanning signal S2 remains to be the first voltage. In the pixel circuit 200, only the transistor TR2, the switch SW1, and the switch SW2 are turned on, and the remaining transistors are all cut off. The transistor TR2 being turned on enables the write-in data signal SD continues to be transmitted to the first end of the capacitor C110 through the transistor TR2. The switch SW1 and the switch SW2 being turned on enables the critical voltage of the driving transistor DTFT to be compensated from the second end of the driving transistor DTFT to the control end of the driving transistor DTFT. Therefore, a voltage difference between the first end of the capacitor C110 and the second end of the capacitor C110 is a critical voltage of the write-in data signal SD and the driving transistor DTFT.

In the emission time interval P_EM, the control voltage ATVG, the scanning signal S1, and the scanning signal S2 are all the second voltage, and the emission signal EM is the first voltage. The reset switch SW_RST, the transistor TR2, the transistor AT, and the switch SW1 and the switch SW2 in the compensation circuit 230 are all cut off, and the transistor TR1 and the light-emitting switch SW_EM are turned on. When the transistor TR1 and the light-emitting switch SW_EM are turned on, a direct current signal of the operating voltage VP is received by the capacitor C110, and the critical voltage value compensated to the control end of the driving transistor DTFT is offset by the driving transistor DTFT. The driving current I_LED is transmitted to the light-emitting element LED1 through the light-emitting switch SW_EM, so that the light-emitting element LED1 may emit light.

In the emission time interval P_EM, since the voltage of the relay end A is higher than the voltage of the control end of the driving transistor DTFT, there is the leakage current flowing from the relay end A to the control end of the driving transistor DTFT. The voltage of the control end of the driving transistor DTFT may rise, and the driving current I_LED may be reduced accordingly. If the leakage current and the voltage at the control end of the driving transistor DTFT change too drastically, the driving current I_LED may be affected so that a brightness of the light-emitting element LED1 might be uneven. Therefore, the embodiment of the disclosure provides the transistor AT. Since the voltage of the control end of the driving transistor DTFT is greater than a potential of the reference voltage end VN coupled to the transistor AT, there is another leakage current flowing from the control end of the driving transistor DTFT through the transistor AT to the reference voltage end VN, so that the leakage current flowing from the relay end A to the control end of the driving transistor DTFT remains stable, and the voltage of the control end of the driving transistor DTFT remains stable to achieve the stabilization of the driving current I_LED.

Figure 4:
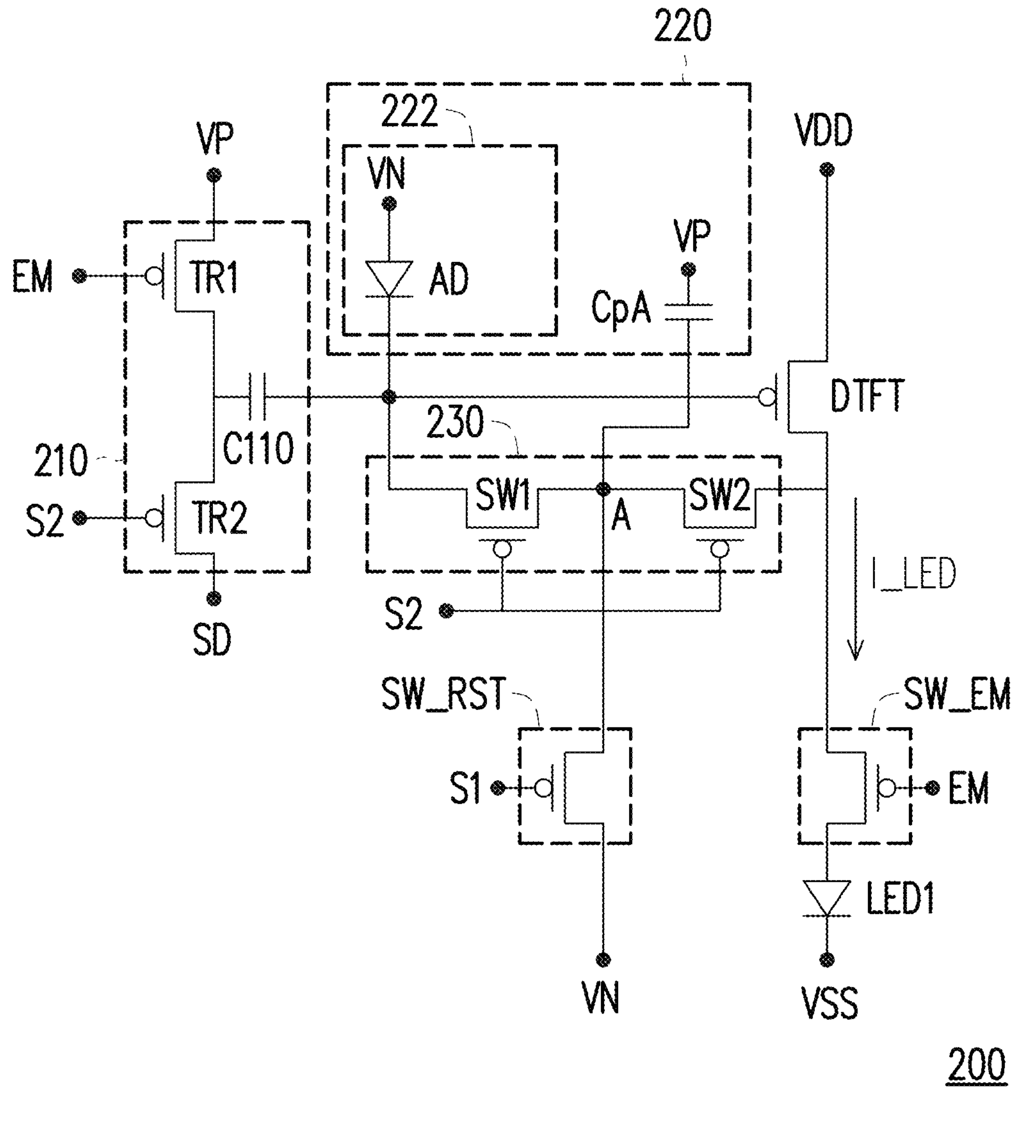
FIG. 4 shows a schematic circuit diagram of another embodiment of the pixel circuit of FIG. 2.

Please refer to FIG. 4. FIG. 4 shows a schematic circuit diagram of another embodiment of the pixel circuit of FIG. 2. In FIG. 4, the impedance provider 222 may be a diode AD, and the anode of the diode AD is coupled to the reference voltage end VN, and the cathode of the diode AD receives the control end voltage of the driving transistor DTFT. The anode of the diode AD coupled to the reference voltage end VN may ensure that when the light-emitting element LED1 emits light, the diode AD is in an off-state, so that the leakage current flows through the diode AD, and the leakage current flowing from the relay end A to the control end of the driving transistor DTFT may remain stable.

Figure 5:
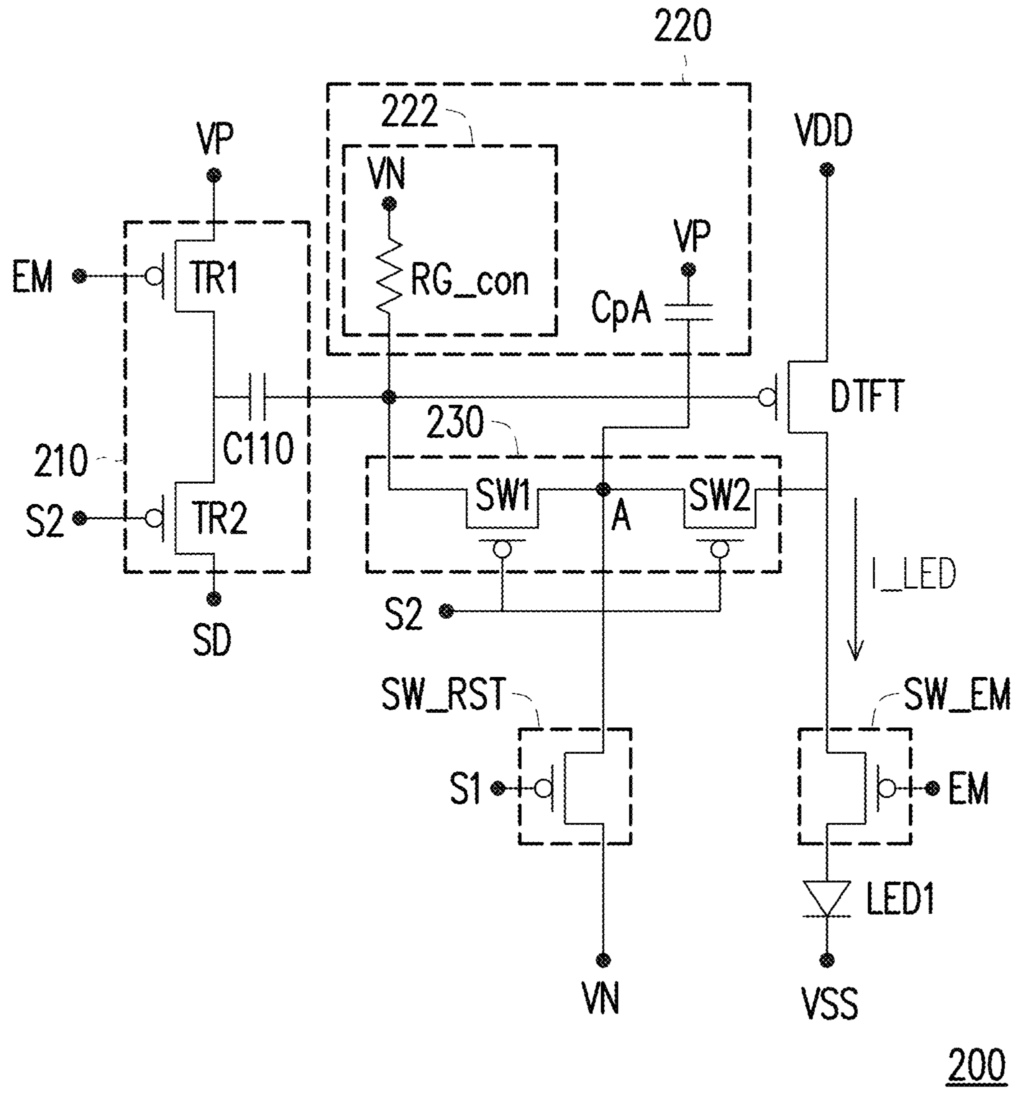
FIG. 5 shows a schematic circuit diagram of another embodiment of the pixel circuit of FIG. 2.

Please refer to FIG. 5. FIG. 5 shows a schematic circuit diagram of another embodiment of the pixel circuit of FIG. 2. In FIG. 5, unlike FIG. 3 and FIG. 4, the impedance provider 222 may be a resistor RG_CON, and the resistor RG_CON is coupled between the reference voltage end VN and the control end of the driving transistor DTFT. In addition, the resistor RG_CON may be a poly resistor with a high resistance value, or may be constructed by using other semiconductor materials that may provide high resistance values without specific restrictions.

Figure 6:
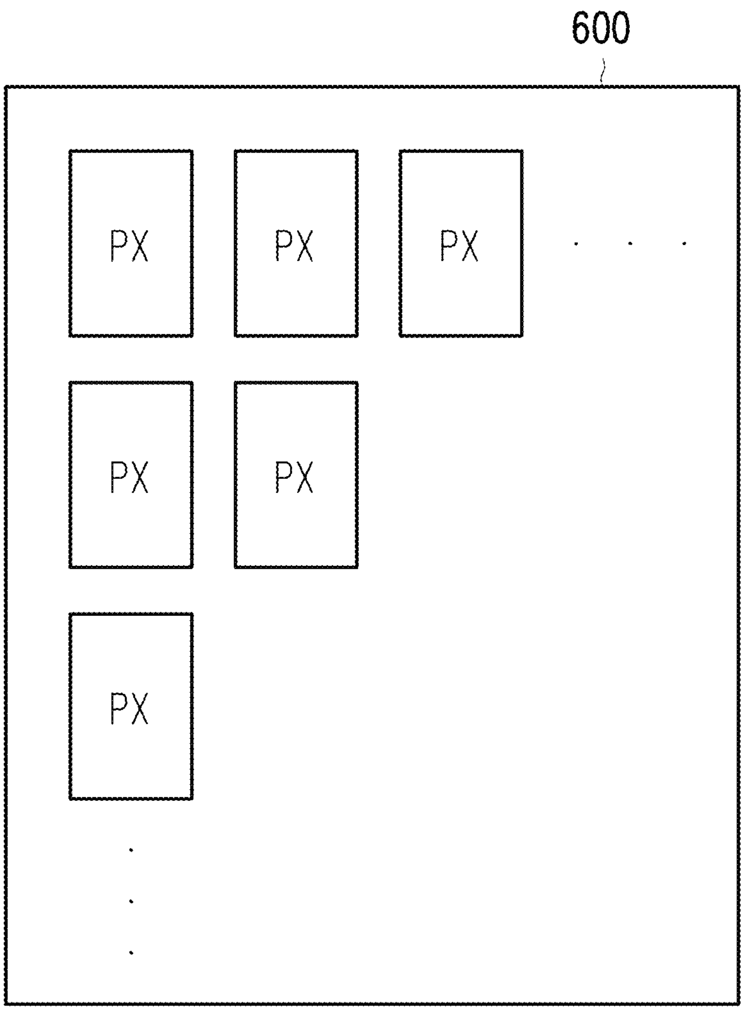
FIG. 6 shows a schematic circuit diagram of a display panel according to an embodiment of the disclosure.

Please refer to FIG. 6. FIG. 6 shows a schematic circuit diagram of a display panel 600 of an embodiment of the disclosure. The display panel 600 includes multiple pixel circuits PX, and the pixel circuits PX are arranged in an array on the display panel 600. The pixel circuit PX may be implemented by applying the pixel circuit 100 or the pixel circuit 200 of the foregoing embodiments. The implementation details of the pixel circuit PX have been described in detail in the foregoing embodiments and will not be described in repetition below.

In summary, the pixel circuit of the disclosure generates the leakage current path on the control end of the driving transistor by providing the voltage control circuit, thereby stabilizing the voltage difference between the control end of the driving transistor and the relay end, so that the voltage on the control end of the driving transistor may remain stable, and brightness homogeneity of the light-emitting element may be effectively improved.

What is claimed is:

1. A pixel circuit, comprising:

a driving transistor, having a first end to receive a power supply voltage;

a data write-in circuit, receiving a first scanning signal, an emission signal, and a write-in data signal, storing the write-in data signal based on the first scanning signal, and providing the write-in data signal to a control end of the driving transistor;

a compensation circuit, having a first switch and a second switch connected in series between the control end of the driving transistor and a second end of the driving transistor, the first switch and the second switch coupled to a relay end and controlled by a second scanning signal;

a voltage control circuit, coupled to the control end of the driving transistor and the relay end to adjust a voltage difference between the control end of the driving transistor and the relay end; and a light-emitting switch, coupled between the second end of the driving transistor and a light-emitting element, and controlled by the emission signal.

2. The pixel circuit according to claim 1, wherein the voltage control circuit comprises:

an impedance provider, coupled to an output end of the data write-in circuit, and configured to stabilize a voltage level of the output end of the data write-in circuit; and a capacitor, coupled to the relay end, and configured to receive an operating voltage.

3. The pixel circuit according to claim 2, wherein the impedance provider is a transistor, and a control end of the transistor receives a bias voltage or the second scanning signal.

4. The pixel circuit according to claim 2, wherein the impedance provider is a diode, a cathode of the diode coupled to the control end of the driving transistor, and an anode of the diode coupled to a reference voltage end.

5. The pixel circuit according to claim 2, wherein the impedance provider is a resistor.

6. The pixel circuit according to claim 1, wherein the data write-in circuit comprises:

a capacitor, having a first end coupled to the control end of the driving transistor;

a first transistor, having a first end receiving an operating voltage, a control end of the first transistor receiving the emission signal, and a second end of the first transistor configured to couple to a second end of the capacitor; and a second transistor, having a first end coupled to the second end of the capacitor, a control end of the second transistor receiving the first scanning signal, and a second end of the second transistor receiving the write-in data signal.

7. The pixel circuit according to claim 1, wherein the compensation circuit comprises:

the first switch, disposed between an output end of the data write-in circuit and the relay end; and the second switch, disposed between the relay end and the second end of the driving transistor, wherein the first switch and the second switch are both controlled by the first scanning signal.

8. The pixel circuit according to claim 6, further comprising a reset switch, the reset switch coupled between the relay end and a reference voltage end, and the reset switch controlled by the second scanning signal.

9. The pixel circuit according to claim 8, wherein in a reset time interval, the reset switch is turned on based on the second scanning signal, so that the relay end is coupled to the reference voltage end, and the second transistor is turned on based on the first scanning signal to allow the write-in data signal to be written into the capacitor; in a compensation time interval, the first switch and the second switch are turned on based on the first scanning signal, and the data write-in circuit stores the write-in data signal; in an emission time interval, the light-emitting switch is turned on based on the emission signal, so that the second end of the driving transistor is grounded to allow the driving transistor to provide a driving current to drive the light-emitting element;

wherein the compensation time interval is between the reset time interval and the emission time interval.

10. A display panel, comprising:

a plurality of the pixel circuits according to claim 1, wherein the plurality of pixel circuits are arranged in an array on the display panel.

* * * * *